United States Patent [19]

Maitre

[11] 3,743,918

[45] July 3, 1973

[54] DC-AC CONVERTER

[75] Inventor: Guy Maitre, Rueil-Malmaison, France

[73] Assignee: U.S. Philips Corporation, New York, N.Y.

[22] Filed: Jan. 31, 1972

[21] Appl. No.: 222,216

[30] Foreign Application Priority Data

Feb. 4, 1971 France ............................ 7103783

[52] U.S. Cl. .................. 321/44, 315/206, 315/219, 315/DIG. 7, 331/112

[51] Int. Cl. .................. H02m , H05b , H03k 3/30

[58] Field of Search .......................... 331/112, 148; 315/DIG. 7, 205, 206, 219, 223; 321/44

[56] References Cited

UNITED STATES PATENTS

| | | | |
|---|---|---|---|
| 3,295,528 | 1/1967 | Masaki | 331/112 |
| 2,982,881 | 5/1961 | Reich | 315/219 X |
| 3,467,887 | 9/1969 | Skirvin | 315/219 X |
| 3,589,337 | 6/1971 | Doss | 331/112 X |
| 3,505,562 | 4/1970 | Engel | 315/206 |

*Primary Examiner*—William H. Beha, Jr.
*Attorney*—Frank R. Trifari

[57] ABSTRACT

A DC-AC transistor converter for supplying a low-pressure mercury vapor discharge lamp.

A capacitive potential divider is used for operation of the transistor while one of the capacitors of this potential divider is arranged between the emitter and the base of the transistor in the converter.

8 Claims, 4 Drawing Figures

DC-AC CONVERTER

This invention relates to a DC-AC converter provided with at least one transistor whose emitter is connected to the base through at least a resistor, and furthermore a transformer which has a primary winding, a coupling winding and a secondary winding, a coupling capacitor being connected between the coupling winding of the transformer and the base of the transistor.

Converters of the kind described are used, for example, in vehicles such as railway trains for the supply of low-pressure mercury vapor discharge lamps. The direct current is then supplied, for example, by a battery.

The use of silicon transistors in such converters instead of the formerly used germanium transistors has, however, given rise to some difficulties emanating from the fact that the voltages generated by the coupling winding of the transformer in the cut-off direction between the emitter and the base of the transistors are rather high for silicon transistors. To prevent a detrimental influence of these high voltages it has been proposed to provide a safeguard in the form of a diode which is arranged in parallel with the emitter-base path of the transistor and this with a pass direction of the diode which is the same as the cut-off direction between the said emitter and the base.

A drawback of such a safety diode is, however, that it eliminates the possibility of using an auxiliary voltage source in the transistor emitter-base circuit during the time intervals that the transistor is non-conductive. This also precludes the possibility of using such an auxiliary voltage source, for example, at the end of the said time intervals for the purpose of influencing the base voltage of the transistor.

It is an object of the present invention to provide a converter of the kind described in the preamble in which the generated emitter-base cut-off voltages of the transistor (or transistors) are relatively low and in which an auxiliary voltage source in the emitter-base circuit also may be active during the time interval that the transistor is non-conductive.

According to the invention a DC-AC converter provided with at least one transistor whose emitter is connected to the base at least through a resistor, and including a transformer which has a primary winding, a coupling winding and a secondary winding in which a coupling capacitor is connected between the coupling winding of the transformer and the base of the transistor is characterized in that a second capacitor whose capacitance is larger than that of the coupling capacitor is connected in series with the coupling capacitor, said second capacitor shunting the resistor in the connection between the emitter and the base of the transistor.

An advantage of this converter is that the cut-off voltage between the emitter and the base of the transistor can then be maintained at a rather low valve because the second capacitor constitutes a capacitive potential divider with the coupling capacitor. In addition this second capacitor may then serve as an auxiliary voltage source in the emitter-base circuit of the transistor.

The capacitance of the second capacitor is preferably approximately 5 to 20 times, and particularly 10 times, the capacitance of the coupling capacitor.

With this capacitance relationship the cut-off voltage between the emitter and the base of the transistor is very low.

A further advantage of a converter according to the invention is that under special conditions such as a given capacitance of the second capacitor and generating a substantially sinusoidal voltage in the coupling winding of the transformer it is also possible to pass sinusoidal currents through the coupling capacitor and hence through the coupling winding. This is an advantage inter alia with a view to the transformer load.

In order that the invention may be readily carried into effect, an embodiment thereof will now be described in detail, by way of example, with reference to the accompanying diagrammatic drawing in which.

Figure 1:
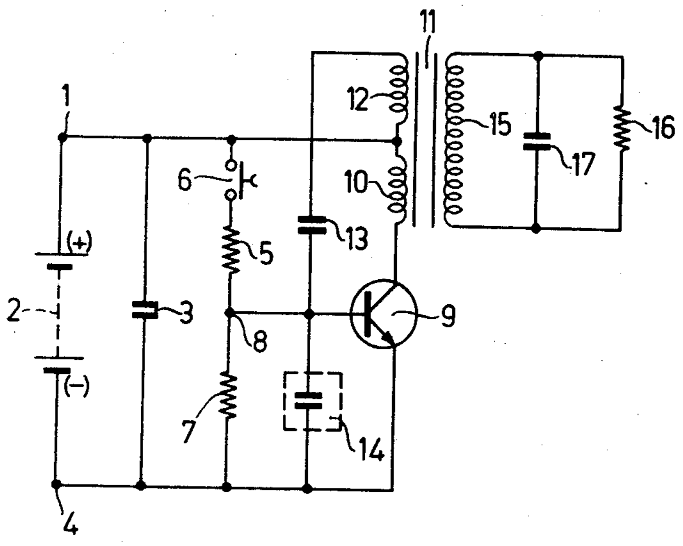
FIG. 1 shows the electrical circuit diagram of a converter according to the invention.
Figure 3:
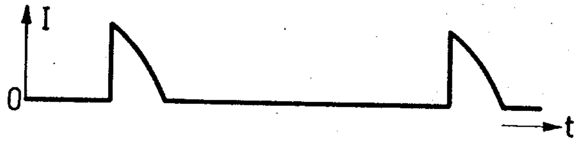
Figure 4:
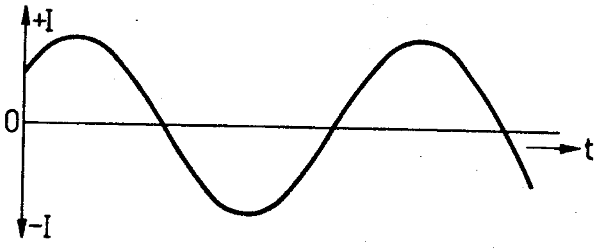

FIG. 3 shows the base current as a function of time of the transistor in the converter according to FIG. 1 in case of induction of the above-mentioned voltage in the coupling winding of the transformer; and FIG. 4 shows the current, as a function of time, flowing through the so-called coupling capacitor in the converter according to FIG. 1 in case of induction of the above-mentioned voltage in the coupling winding of the transformer.

Figure 2:
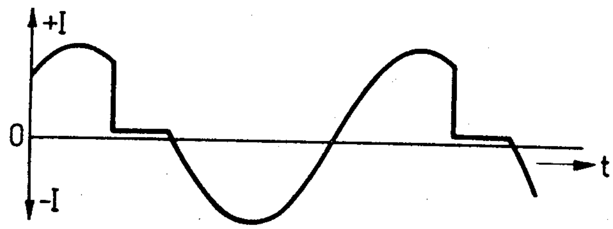
FIG. 2 shows the current, as a function of time, flowing through the so-called second capacitor in the converter according to FIG. 1 if a sinusoidal voltage is induced in the coupling winding of the converter transformer.

FIGS. 2, 3 and 4 are provided with identical time axes.

In FIG. 1 the reference numeral 1 denotes the positive terminal of a battery 2. An electrolytic capacitor 3 is incorporated in a connection between the positive terminal 1 and the negative terminal 4 of the battery.

An ignition resistor is denoted by the reference numeral 5. One end of this resistor 5 can be connected through a push-button contact 6 to the positive terminal 1 of the battery. The other end of the ignition resistor 5 is connected through a second resistor 7 to the negative terminal 4 of the battery.

One point in the connection branch between resistors 5 and 7 is denoted by the reference numeral 8. This point is connected to the base of an NPN-transistor 9. The emitter of this transistor 9 is connected to the negative terminal 4 of the battery. The collector of transistor 9 is connected to the positive terminal 1 of the battery through a primary winding 10 of a transformer 11. Furthermore the end of winding 10 facing terminal 1 is connected to one end of a coupling winding 12 of transformer 11. The other end of this coupling winding 12 is connected to the base of transistor 9 through a coupling capacitor 13.

A second capacitor 14 is incorporated between the base of transistor 9 and the negative terminal 4 of the battery. Capacitors 13 and 14 constitute a capacitive potential divider for the voltage originating from coupling winding 12.

The ends of a secondary winding 15 of transformer 11 are connected together by a load 16 consisting of a low-pressure mercury vapor discharge lamp provided with a ballast (stabilizing element) and an ignition device. The load 16 is not shown in detail. The ends of the secondary winding 15 are also connected together through a tuning capacitor 17.

For obtaining substantially sinusoidal voltages in the transformer windings 12 and 15, some inductance should be present in the main current circuit of transistor 9. This inductance may be partly constituted by the leakage inductance of winding 10 or it may consist mainly of, for example, an inductance (not shown) between terminal 1 and winding 10, which is common practice in converters.

The converter is started as follows: when switch 6 closes, the base of transistor 9 is rendered positive relative to its emitter due to the potential difference across the second resistor 7 so that transistor 9 becomes conductive whereby the converter is started.

When the converter has become operative switch 6 can be opened again. The potential at the base of transistor 9 is then determined by the capacitive voltage division of the two capacitors 13 and 14 and the second resistor 7. Opening the switch 6 has the result that losses no longer occur in the resistor 5 in the operating condition of the converter.

Transistor 9 is then periodically rendered conductive due to the oscillation of the voltages across the transformer windings. A negative charge on capacitor 14, which in this case acts as an auxiliary direct voltage source, then delays the instant when transistor 9 becomes conductive.

When transistor 9 conducts the battery 2 provides the energy for the load and for the losses of the converter.

In a practical embodiment the electric currents flowing through the second capacitor 14 and the base of transistor 9 had, as a function of time, the waveforms shown in FIGS. 2 and 3, respectively.

FIG. 2 shows that the current flowing through capacitor 14 is substantially sinusoidal, except for a recessed part having a duration of approximately one-third of a half period of this alternating current.

FIGS. 2 and 3 furthermore show that the base current of transistor 9 flows at the end of each half positive period of the current flowing through capacitor 14, namely during the time interval corresponding to the recessed part (see FIG. 2) of the current flowing through capacitor 14.

FIG. 4, which shows an addition of the current intensities plotted against time in FIGS. 2 and 3, illustrates that the electric current provided by coupling winding 12 is substantially sinusoidal, which — as already noted — enhances the action of the transformer 11 and also the output of the arrangement.

The ratio between the capacitances of the second capacitor 14 and coupling capacitor 13 was approximately 10 to one in the embodiment described (namely approximately 440 *n* Farad to 47 *n* Farad).

What is claimed is:

1. A DC-AC converter comprising a transistor, a source of DC voltage connected in series with the emitter-collector path of the transistor, a resistor connected between the emitter and base of the transistor so as to lie outside of the emitter-collector DC current path of the transistor, a transformer having a primary winding, a coupling winding and a secondary winding, a coupling capacitor connected between the coupling winding of the transformer and the base of the transistor, a second capacitor whose capacitance is larger than that of the coupling capacitor, means connecting the second capacitor in series with the coupling capacitor and in shunt with said resistor in the connection between the emitter and the base of the transistor.

2. A DC-AC converter as claimed in claim 1, characterized in that the ratio between the capacitance of the second capacitor and that of the coupling capacitor lies in the range between 5 to 1 and 20 to 1 and is preferably approximately 10 to 1.

3. A DC-AC converter as claimed in claim 1 wherein a load including a discharge lamp is connected to the secondary winding of the transformer, and means connecting the primary winding and the coupling winding to the collector of the transistor.

4. A converter as claimed in claim 1 further comprising means connecting one terminal of the coupling winding to the collector of the transistor and the other terminal to said coupling capacitor so that the coupling capacitor is connected between the collector and base electrodes of the transistor.

5. A converter comprising, a transistor having emitter, base and collector electrodes, a pair of terminals adapted to be connected to a source of DC supply voltage, a transformer having a primary, secondary and auxiliary winding, means connecting said primary winding in series with the transistor across said terminals, first and second capacitors, means connecting the auxiliary winding and the first capacitor in series between the collector and base electrodes of the transistor, a resistor, means connecting said resistor and said second capacitor in parallel between the base and emitter of the transistor in a manner such that the emitter current of the transistor bypasses said resistor and second capacitor and said first and second capacitors are series connected to form a capacitive voltage divider for a voltage developed in said auxiliary winding, the capacitance of said second capacitor being greater than the capacitance of the first capacitor, and means for coupling the secondary winding to a load.

6. A converter as claimed in claim 5 wherein said primary winding, said auxiliary winding and said first capacitor are serially connected, in the order named, between the collector and base electrodes of the transistor, and one of said supply terminals is connected to the junction point between said primary and auxiliary windings.

7. A converter as claimed in claim 5 further comprising means for disconnecting the base electrode of the transistor from the supply terminals during operation of the converter thereby to isolate the base-emitter path of the transistor from any DC current flow from the supply terminals.

8. A converter as claimed in claim 5 wherein the ratio of the capacitance of the second capacitor to the capacitance of the first capacitor lies in the range between 5 to 1 and 20 to 1.

* * * * *